(12) United States Patent
Botelho et al.

(10) Patent No.: US 9,708,491 B2
(45) Date of Patent: Jul. 18, 2017

(54) OPTICAL FIBER COATING AND COMPOSITION

(71) Applicant: Corning Incorporated, Corning, NY (US)

(72) Inventors: John William Botelho, Corning, NY (US); Ruchi Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/711,909

(22) Filed: May 14, 2015

(65) Prior Publication Data

US 2015/0353757 A1 Dec. 10, 2015

Related U.S. Application Data

(60) Provisional application No. 62/007,448, filed on Jun. 4, 2014.

(51) Int. Cl.

| | | |
|---|---|---|
| *C08F 2/46* | (2006.01) | |
| *C08F 2/50* | (2006.01) | |
| *C08G 61/04* | (2006.01) | |
| *C09D 4/00* | (2006.01) | |
| *C09D 133/10* | (2006.01) | |
| *C09D 133/12* | (2006.01) | |
| *C09D 133/14* | (2006.01) | |
| *C08F 220/28* | (2006.01) | |

(52) U.S. Cl.
CPC .............. *C09D 4/00* (2013.01); *C09D 133/10* (2013.01); *C09D 133/12* (2013.01); *C09D 133/14* (2013.01); *C08F 2220/286* (2013.01)

(58) Field of Classification Search
CPC ............ G02B 6/02033; G02B 6/02395; C03C 25/326; C03C 25/285; C03C 25/1065
USPC .................. 522/64; 520/1; 524/850
See application file for complete search history.

(56) References Cited

U.S. PATENT DOCUMENTS

| | | | |
|---|---|---|---|
| 4,474,830 A | 10/1984 | Taylor | |
| 4,581,165 A | 4/1986 | Frank et al. | |
| 6,563,996 B1 * | 5/2003 | Winningham | C03C 25/106 385/123 |
| 7,010,206 B1 | 3/2006 | Baker et al. | |
| 8,093,322 B2 * | 1/2012 | Hancock, Jr. | C08F 283/00 524/186 |
| 2003/0044140 A1 * | 3/2003 | Fewkes | C03C 25/106 385/114 |
| 2005/0148738 A1 * | 7/2005 | Leon | C08F 8/16 525/386 |
| 2008/0125546 A1 * | 5/2008 | Yamaguchi | C08G 18/289 525/123 |
| 2008/0161443 A1 * | 7/2008 | Lee | C03C 25/106 522/78 |
| 2011/0217011 A1 * | 9/2011 | Bennett | G02B 6/0288 385/124 |
| 2012/0196122 A1 * | 8/2012 | Bishop | C03C 25/106 428/392 |
| 2015/0071595 A1 * | 3/2015 | Chen | G02B 6/02395 385/123 |

FOREIGN PATENT DOCUMENTS

| | | | |
|---|---|---|---|
| EP | 2322576 | | 5/2011 |
| WO | 2005017053 | | 2/2005 |
| WO | 2008076299 | | 6/2008 |
| WO | 2010-008174 | * | 1/2010 |
| WO | 2014081004 | | 5/2014 |
| WO | 2014172143 | | 10/2014 |

OTHER PUBLICATIONS

International Search Report, issued in connection with corresponding PCT application No. PCT/US2015/034094, Sep. 8, 2015.

* cited by examiner

*Primary Examiner* — Jessica E Whiteley
(74) *Attorney, Agent, or Firm* — Kevin L. Bray

(57) ABSTRACT

A treated monomer for optical fiber coatings, a coating composition containing the treated monomer, a coating formed from a coating composition containing a treated monomer, and a fiber coated with the coating formed from a coating composition containing a treated monomer. The monomer is an alkoxylated alkyl acrylate and is formed by acrylating a polyol precursor. The monomer may include residual unreacted polyol precursor. The monomer is treated with a derivatizing agent to convert residual unreacted polyol to a derivative form. The derivative form is less susceptible to degradation to the corresponding non-alkoxylated alcohol or other lower alkoxylated alcohol. The treated monomer includes the alkoxylated alkyl acrylate and the derivative form of the polyol.

37 Claims, 2 Drawing Sheets

OPTICAL FIBER COATING AND COMPOSITION

This application claims the benefit of priority under 35 U.S.C. §119 of U.S. Provisional Application Ser. No. 62/007,448 filed on Jun. 4, 2014 the content of which is relied upon and incorporated herein by reference in its entirety.

FIELD

This description pertains to coatings and coating compositions for optical fibers. More particularly, this description pertains to alkoxylated acrylate monomers as components of coating compositions for optical fibers. Most particularly, this description pertains to alkoxylated acrylate monomers formed from polyol starting materials, where residual unreacted polyol starting materials in the monomers has been treated to derivatize hydroxyl or alcohol groups.

BACKGROUND

The light transmitting performance of an optical fiber is highly dependent upon the properties of the polymer coating that is applied to the fiber during manufacturing. Typically a dual-layer coating system is used where a soft inner-primary coating is in contact with the glass fiber and a harder, outer-primary or secondary coating surrounds the inner-primary coating. The hard coating allows the fiber to be handled and further processed, while the soft coating plays a key role in dissipating external forces and preventing them from being transferred to the fiber where they can cause microbend induced light attenuation.

The functional requirements of the inner-primary coating place various requirements on the materials that are used for these coatings. The Young's modulus of the inner-primary coating is generally less than 1 MPa, or less than 0.5 MPa. The glass transition temperature of the inner-primary coating is less than 5° C., and is ideally about −20° C. or less to ensure that the coating remains soft when the fiber is subjected to low temperatures. In order to ensure uniform deposition on the fiber, the coating is applied to the fiber in liquid form and must quickly form a solid having sufficient integrity to support application of the outer-primary coating. Also, the tensile strength of the coating, which generally decreases as the modulus decreases, must be high enough to prevent tearing defects during draw processing or subsequent processing of the coated fiber during cabling, etc. The functional requirements for the outer-secondary coating include properties that provide mechanical rigidity. The Young's modulus of the outer-secondary coating is generally greater than 1200 MPa, or greater than 1400 MPa. The glass transition temperature of the outer-secondary coating is preferably greater than 30° C., or greater than 40° C., or greater than 50° C.

To meet these requirements, optical fiber coatings have traditionally been formulated as mixtures of radiation-curable urethane acrylate oligomers and radiation-curable acrylate functional diluent monomers. Upon exposure to light and in the presence of a photoinitiator, the acrylate groups rapidly polymerize to form a crosslinked polymer network which is further strengthened by the hydrogen bonding interactions between urethane groups along the oligomer backbone. By varying the chemical formula, molecular weight, and relative proportions of acrylate monomer(s) and urethane acrylate oligomer(s), it is possible to form coatings having very low modulus values and low glass transition temperatures while still having sufficient tensile strength to function as a primary coating as well as coatings having sufficiently high modulus values and glass transition temperatures to function as secondary coatings. Numerous optical fiber coating formulations have been disclosed in the art in which the composition of the coating formulation has been varied to achieve different property targets in cured coatings that cover a wide range of characteristics.

Diluent monomers generally have lower molecular weights than the oligomer components of coating compositions and are included in part to facilitate processing by controlling the viscosity of the coating composition. Diluent monomers are also typically reactive and participate in the curing reaction that produces the ultimate coating for the fiber. Diluent monomers are often monofunctional acrylate monomers. A common class of diluent monomers is the alkoxylated alkyl acrylates, which can be prepared by a reaction of a polyol and an alkyl-substituted methacrylic acid. Under typical conditions, the reaction to form alkoxylated alkyl acrylates is incomplete and the alkoxylated alkyl acrylate product includes residual amounts of unreacted starting materials. Since purification of the alkoxylated alkyl acrylate product is expensive and since the presence of residual unreacted starting materials in coatings formed by curing compositions containing alkoxylated alkyl acrylate monomers does not significantly affect the mechanical and tensile properties of the coatings, alkoxylated alkyl acrylate monomers are often used in an unpurified form and coating compositions based on alkoxylated alkyl acrylate monomers may include residual unreacted starting materials used in the synthesis of alkoxylated alkyl acrylate monomers.

Although the presence of unreacted starting materials from the synthesis of alkoxylated alkyl acrylate monomers in the coating composition does not significantly impact the curing process or the properties of coatings cured from the coating composition, the unreacted starting materials may become incorporated in fiber coatings. It has recently been recognized that impurities and residual matter present in fiber coatings can leach out of the coating as the fiber ages. Concerns arise if components that leach from fiber coatings are toxic or harmful to the environment.

In coatings that contain alkoxylated alkyl acrylate monomers, recent attention has focused on the leaching of residual unreacted hydroxyl compounds, such as ethoxylated nonylphenol, from fiber coatings. Ethoxylated nonylphenol and other alkoxylated alcohols may be referred to herein as polyols. The European Union, for example, has recently identified ethoxylated nonylphenol as a substance of concern. Ethoxylated nonylphenol is a staring material for ethoxylated nonylphenol acrylates, which are widely used as diluent monomers in fiber coatings. Standard commercial ethoxylated nonylphenol acrylate monomers typically include 1 wt % or more of unreacted ethoxylated nonylphenol. The residual amounts of unreacted ethoxylated nonylphenol are present in fiber coatings formed from ethoxylated nonylphenol acrylate monomers and are susceptible to leaching from the fiber coating. When leached, ethoxylated nonylphenol can decompose to form nonylphenol. From an environmental standpoint, nonylphenol is a regulated substance because it is known to be hazardous to marine life. Current European Union regulations specify a maximum level of 0.1 wt % of ethoxylated nonylphenol.

Given the advantageous properties of coatings formed from compositions that include alkoxylated alkyl acrylate monomers, it would be desirable to develop coating compositions based on alkoxylated alkyl acrylate monomers that contain reduced levels of unreacted ethoxylated nonylphenol.

SUMMARY

The present description provides a treated monomer for use in coating compositions and coatings for optical fibers. The coating compositions may be used to form primary coatings, secondary coatings, or coatings for fiber ribbons. The coating compositions may include one or more monomers, one or more oligomers, a curing agent, and one or more optional additives.

The present description recognizes that alkoxylated alkyl acrylate monomers are normally prepared by acrylation reaction of polyol and that conventional sources of alkoxylated alkyl acrylate monomers frequently contain residual amounts of polyol starting material. When cured to form coatings, the residual polyol may become incorporated in the coating and is subject to later release from the coating. Released polyol may subsequently decompose to the corresponding non-alkoxylated alcohol, which may pose a threat to the environment.

The objective of the present description is to prevent or minimize the potential for release of environmentally harmful components (or precursors thereof) from fiber coatings. The strategy disclosed herein provides a derivatization scheme that converts residual polyol components in alkoxylated alkyl acrylate monomers to derivative forms that are environmentally benign and/or less likely to be released from fiber coatings. In the derivatization scheme, the alkoxylated alkyl acrylate monomer is treated with a derivatizing agent that reacts with the terminal alcohol group to provide a derivative compound. In the derivative compound, the terminal alcohol is functionalized to a different group. The derivative compound thus lacks the terminal alcohol group and is less likely to degrade or otherwise revert back to the corresponding non-alkoxylated alcohol or other lower alkoxylated alcohol.

In one embodiment, the derivatizing agent includes an isocyanate group and the derivatization scheme involves a reaction of the terminal hydroxyl group of residual polyol with the isocyanate group to form a urethane linkage. The derivatizing agent may include one or more isocyanate groups. In one embodiment, the derivatizing agent is a diisocyanate compound and each isocyanate group of the diisocyanate compound reacts with an equivalent of polyol.

The derivatization reaction may be performed at various stages of the coating formulation process. Treatment with the derivatizing agent preferably occurs before curing of the coating composition. Treatment of an alkoxylated alkyl acrylate monomer with a derivatizing agent may occur with the alkoxylated alkyl acrylate monomer alone or in combination with one or more other components of a coating composition. In one embodiment, an alkoxylated alkyl acrylate monomer is treated with a derivatizing agent to derivatize residual polyol before the monomer is combined with other components to form a coating composition. In another embodiment, an untreated alkoxylated alkyl acrylate monomer is combined with an oligomer and the combination is treated with a derivatizing agent before adding other components of the coating composition. In still another embodiment, an untreated alkoxylated alkyl acrylate monomer is combined with all other components of the coating composition and the coating composition is subsequently treated with a derivatizing agent.

In one embodiment, an alkoxylated alkyl acrylate monomer is treated before incorporation into a coating composition with an amount of derivatizing agent sufficient to reduce the concentration of residual polyol in the alkoxylated acrylate monomer to less than 1.0 wt %, or less than 0.5 wt %, or less than 0.25 wt %, or less than 0.15 wt %, or less than 0.10 wt %, or less than 0.05 wt %. The treated alkoxylated alkyl acrylate monomer may then be combined with other components to form a coating composition. In another embodiment, an alkoxylated alkyl acrylate monomer is treated before incorporation into a coating composition with an amount of derivatizing agent sufficient to reduce the concentration of residual polyol in the coating composition, made by combining alkoxylated alkyl acrylate monomer with other coating components, to less than 1.0 wt %, or less than 0.5 wt %, or less than 0.25 wt %, or less than 0.15 wt %, or less than 0.10 wt %, or less than 0.05 wt %.

In other embodiments, an untreated alkoxylated alkyl acrylate monomer is combined with one or more other components of a coating composition and the mixture is treated with an amount of derivatizing agent sufficient to reduce the concentration of residual polyol in the mixture to less than 1.0 wt %, or less than 0.5 wt %, or less than 0.25 wt %, or less than 0.15 wt %, or less than 0.10 wt %, or less than 0.05 wt %.

In another embodiment, an oligomer with a polyol block is treated before incorporation into a coating composition with an amount of derivatizing agent sufficient to reduce the concentration of residual polyol to less than 1.0 wt %, or less than 0.5 wt %, or less than 0.25 wt %, or less than 0.15 wt %, or less than 0.10 wt %, or less than 0.05 wt %. The treated alkoxylated alkyl acrylate monomer may then be combined with other components to form a coating composition.

The coating composition containing treated alkoxylated alkyl acrylate monomer (irrespective of when the derivatizing agent is added) may be cured to form a coating or other cured product. The resulting coating or cured product may have a concentration of residual polyol less than 1.0 wt %, or less than 0.5 wt %, or less than 0.25 wt %, or less than 0.15 wt %, or less than 0.10 wt %, or less than 0.05 wt %.

The coating composition may include an oligomer with a polyol block. Oligomers with a polyol block may be prepared from polyols and may include residual amounts of unreacted polyol. The unreacted polyol may become incorporated in coatings formed by curing coating compositions containing an oligomer with a polyol block. Oligomers with residual polyol content may be treated with a derivatizing agent to convert residual polyol to a derivative form lacking a terminal hydroxyl group. The derivative form of the polyol may be less susceptible to degradation to the corresponding non-alkoxylated alcohol or other lower alkoxylated alcohol.

The present description encompasses:

A coating composition comprising:

an acrylate monomer having the formula

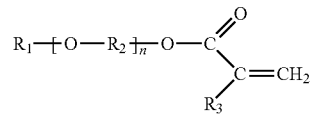

and a derivative compound having the formula

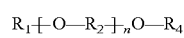

wherein n is an integer, $R_1$ is H, an alkyl group, an aromatic group, or an alkyl-substituted aromatic group, $R_2$ is an alkylene group, $R_3$ is H or an alkyl group, and $R_4$ is not H.

The present description encompasses:
The cured product of a coating composition comprising:
an acrylate monomer having the formula

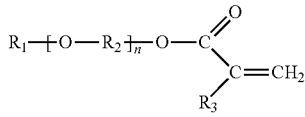

and a derivative compound having the formula

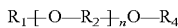

wherein n is an integer, $R_1$ is H, an alkyl group, an aromatic group, or an alkyl-substituted aromatic group, $R_2$ is an alkylene group, $R_3$ is H or an alkyl group, and $R_4$ is not H.

The present description encompasses:
A fiber comprising glass and a coating, said coating comprising the cured product of a coating composition comprising:
an acrylate monomer having the formula

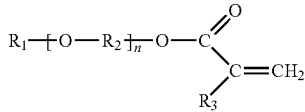

and a derivative compound having the formula

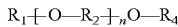

wherein n is an integer, $R_1$ is H, an alkyl group, an aromatic group, or an alkyl-substituted aromatic group, $R_2$ is an alkylene group, $R_3$ is H or an alkyl group, and $R_4$ is not H.

The present description encompasses:
A method of forming a coating comprising treating a monomer composition with a derivatizing agent to form a coating composition, said monomer composition comprising:
an acrylate monomer having the formula:

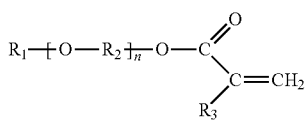

and a polyol having the formula:

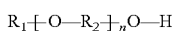

said derivatizing agent converting said polyol to a derivative compound having the formula:

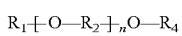

wherein n is an integer, $R_1$ is H, an alkyl group, an aromatic group, or an alkyl-substituted aromatic group, $R_2$ is an alkylene group, $R_3$ is H or an alkyl group, and $R_4$ is not H.

The present description encompasses:
A method of forming a coating comprising:
combining a monomer composition with an oligomer to form a coating composition, said monomer composition comprising:
an acrylate monomer having the formula:

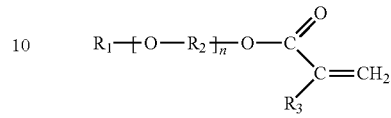

and a polyol having the formula:

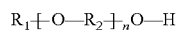

treating said coating composition with a derivatizing agent, said derivatizing agent converting said polyol to a derivative compound having the formula:

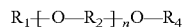

wherein n is an integer, $R_1$ is H, an alkyl group, an aromatic group, or an alkyl-substituted aromatic group, $R_2$ is an alkylene group, $R_3$ is H or an alkyl group, and $R_4$ is not H.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the description, it is believed that the description will be better understood from the following specification when taken in conjunction with the accompanying drawings, wherein:

DETAILED DESCRIPTION

Figure 1:
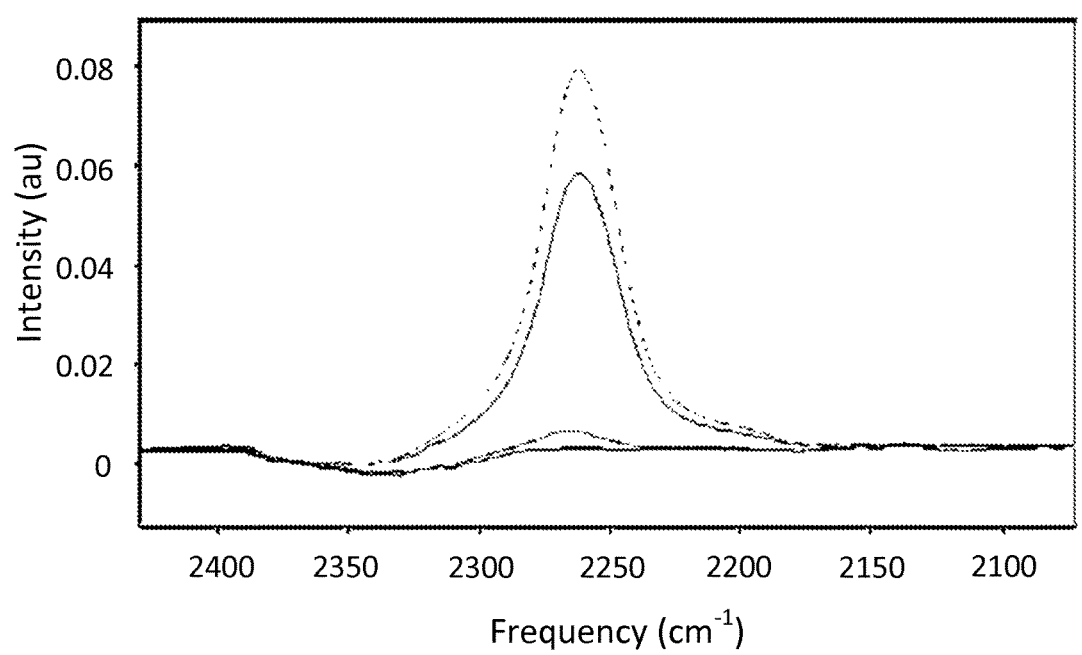
FIG. 1 depicts the time evolution of the FTIR spectrum in the region of an isocyanate absorption band for an ethoxylated(4)nonylphenol acrylate monomer during treatment with a diisocyanate derivatizing agent.

The present description provides a treated monomer for use in coating compositions and coatings for optical fibers. The treated monomer includes an alkoxylated alkyl acrylate monomer and a derivative of the corresponding alkoxylated alkyl starting material from which the alkoxylated alkyl acrylate monomer may be derived. The alkoxylated alkyl starting material is the non-acrylated hydroxyl containing analog of the alkoxylated alkyl acrylate monomer. The alkoxylated alkyl starting material may be referred to herein as a polyol or unreacted polyol starting material. The derivative of the polyol is formed by functionalizing the polyol through reaction of the terminal alcohol group of the polyol. Functionalization of the terminal alcohol group of the unreacted polyol yields a derivative that is not (or less) susceptible to degrading to the non-alkoxylated alkyl alcohol analog of the polyol. The treated monomer may be included as a component of a coating composition that may include other monomers, oligomers, and additives as described in greater detail hereinbelow. The treated monomer may also be used as a starting material for synthesis of the oligomer component of the coating composition.

Alkoxylated alkyl acrylate monomers are a common class of diluent monomers used in compositions for coatings for fibers and other applications. The alkoxylated alkyl acrylates have the general formula (I):

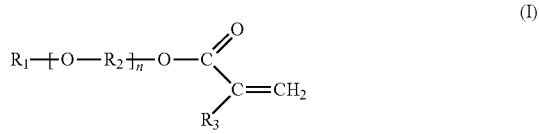

(I)

where $R_2$ is an alkylene group, $R_1$ is hydrogen, an alkyl group, an aromatic group, or an alkyl-substituted aromatic group; and $R_3$ is hydrogen or an alkyl group. $R_2$ may be a $C_1$ or higher alkylene group, or a $C_2$ or higher alkylene group, or a $C_3$ or higher alkylene group, or a $C_4$ or higher alkylene group. $R_2$ may be a linear or branched alkylene group. Embodiments for $R_2$ include: methylene ($CH_2$), ethylene (($CH_2$)$_2$), n-propylene (($CH_2$)$_3$), or more generally ($CH_2$)$_n$, where n is an integer. Branched embodiments for $R_2$ include isopropylene and isobutylene. When $R_1$ and $R_3$ are alkyl groups, they may be linear or branched. $R_1$ may be a $C_1$ or higher alkyl group, or a $C_2$ or higher alkyl group, or a $C_3$ or higher alkyl group, or a $C_4$ or higher alkyl group. $R_1$ may include an aromatic group such as phenyl, phenylene, or alkyl-substituted phenyl. The integer n may be in the range from 1-12, or from 1-10, or from 1-8, or from 1-6, or from 1-4, or from 2-9, or from 3-8, or from 4-6. The ranges listed for the integer n are inclusive of the end points.

The alkoxylated alkyl acrylates can be prepared by a reaction of a polyol having the general formula (II) and (meth)acrylic acid or an alkyl-substituted (meth)acrylic acid having the general formula (III):

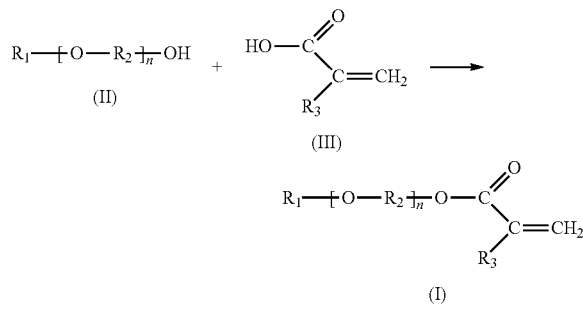

The polyol of formula (II) and methacrylic or alkyl-substituted methacrylic acid of formula (III) may be referred to herein as starting materials for preparation of the alkoxylated alkyl acrylate monomer of formula (I). Polyol (II) may be referred to herein as the polyol, hydroxyl containing compound, polyol starting material, alkoxylated alkyl or alkoxylated alkyl starting material corresponding to alkoxylated alkyl acrylate (I).

As noted above, the reaction that produces alkoxylated alkyl acrylate monomer (I) is incomplete and the product may include an unreacted portion of polyol (II) in addition to alkoxylated alkyl acrylate monomer (I). Unless additional measures are taken, coating compositions formulated with alkoxylated alkyl acrylate monomer (I) will include some amount of polyol (II) and the coating formed by curing the coating composition may also include a residual level of polyol (II). When present in the coating, polyol (II) is susceptible to leaching or otherwise separating from the coating and may enter the surrounding environment where it may degrade to form the corresponding non-alkoxylated alcohol having the formula $R_1OH$.

The corresponding non-alkoxylated alcohol having the formula $R_1OH$ may also be present in residual amounts or as an unreacted component of polyol (II). Synthesis of polyol (II) may entail an alkoxylation reaction of alcohol $R_1OH$, where the alkoxylation reaction may not proceed to completion and unless purified or otherwise treated, polyol (II) may include a certain amount of unreacted alcohol $R_1OH$. When polyol (II) is used to form alkoxylated alkyl acrylate (I), residual alcohol $R_1OH$ may become incorporated in coating compositions and coatings formed from alkoxylated alkyl acrylate (I) and may be susceptible to release to the environment.

In the event that the non-alkoxylated alcohol $R_1OH$ corresponding to polyol (II) is harmful to the surrounding environment, it is desirable to prevent its formation. Conventional strategies for preventing or inhibiting formation of undesirable alcohols include (1) purifying the alkoxylated alkyl acrylate monomer to remove unreacted polyol starting material; (2) avoiding alkoxylated alkyl acrylate monomers having corresponding polyol starting materials that degrade readily; and (3) driving the formation reaction of alkoxylated alkyl acrylate monomer to completion. These strategies, however, have limitations. Strategies (1) and (3) add to the cost of manufacturing of the coating and potentially are technically difficult to achieve, while strategy (2) risks compromising the properties of the cured coating by unduly limiting the range of alkoxylated alkyl acrylate monomers available for coating formulations.

The present description provides an alternative strategy for preventing formation of undesirable byproducts from components leached or otherwise released by coating materials. The strategy recognizes the likely presence of small amounts of unreacted polyol (II) and/or corresponding non-alkoxylated alcohol $R_1OH$ in alkoxylated alkyl acrylate monomer (III) and seeks to neutralize the potential environmental impact of unreacted polyol (II) and unreacted corresponding alcohol $R_1OH$ by converting them to less problematic derivative forms before curing of the coating composition. In one embodiment, the derivative form is less problematic if released from the coating after curing because it poses a lower threat to the environment and/or is more resistant to degradation to harmful compounds than unreacted polyol (II). The derivative form, for example, may be less likely to degrade to the non-alkoxylated alcohol $R_1OH$ corresponding to unreacted polyol (II). In another embodiment, the derivative form is less problematic because it associates more strongly with the cured coating and is less prone to being leached or otherwise released from the coating after curing.

Treatment may include reaction of the terminal alcohol of polyol (II) with a derivatizing agent to form a derivative compound having the formula (IV):

where $R_4$ is the residue of the derivatizing agent. Through the derivatization treatment, the terminal alcohol is converted to a non-alcohol group so that $R_4$ is different from hydrogen. Corresponding alcohol $R_1OH$ may be treated in a similar fashion. In one embodiment, the derivatizing agent is an acid chloride or a carboxylic acid and reaction of the derivatizing agent with the terminal alcohol group of polyol (II) forms a derivative compound with an ester linkage. In another embodiment, the derivatizing agent is an isocyanate or a diisocyanate and reaction of the derivatizing agent with the terminal alcohol group of polyol (II) forms a derivative compound with a urethane linkage. The derivatization reaction may include a derivatizing agent with multiple functional groups (e.g. a diacid chloride, dicarboxylic acid, diisocyanate, or mixed functional groups such as a derivatizing agent with an isocyanate group and a carboxylic acid group). In instances in which the derivatizing agent is multifunctional, the terminal alcohol group of polyol (II) may be converted to a derivative compound having a different terminal (or interior) functional group and may be further reacted.

By way of example, reaction of an isocyanate with polyol (II) produces a derivative compound with a urethane linkage according to the reaction:

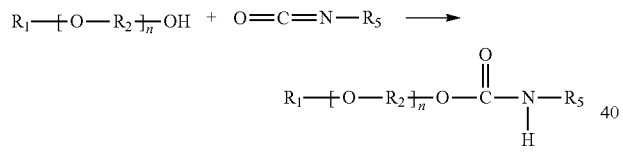

where $R_5$ is an organic group that may optionally include one or more additional functional groups.

The reaction of a diisocyanate with polyol (II) produces a derivative compound with a urethane linkage and a free isocyanate group according to the reaction:

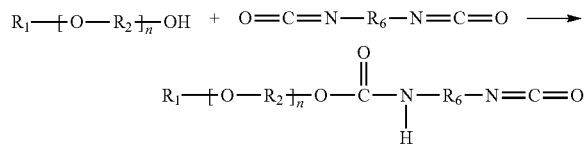

where $R_6$ is an organic group. The free isocyanate group may further react with additional equivalents of polyol (II) to produce a derivative compound with two urethane linkages:

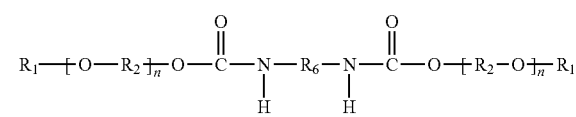

The relative amounts of derivative compounds with one urethane linkage and two urethane linkages can be controlled through the stoichiometric ratio of the diisocyanate to polyol.

When the derivatizing agent includes a compound having one or more isocyanate groups, the amount of derivatizing agent can be controlled so that essentially all isocyanate groups react to convert polyol (II) to a derivative form and essentially no unreacted isocyanate groups remain in the monomer composition or coating composition in which the monomer is included.

In one embodiment, the alkoxylated alkyl acrylate monomer is ethoxylated nonylphenol acrylate, which has the formula:

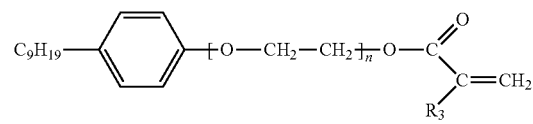

where the nonyl group ($C_9H_{19}$) may be linear or branched and $n \geq 1$. Ethoxylated nonylphenol acrylate may be prepared from the corresponding polyol ethoxylated nonylphenol:

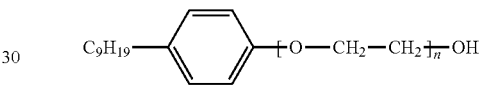

and may contain unreacted amounts thereof that may be incorporated in and subject to release from cured coating compositions that include ethoxylated nonylphenol acrylate. Ethoxylated nonylphenol may degrade to the corresponding non-ethoxylated alcohol nonylphenol:

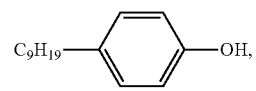

which is regarded as a substance of concern from an environmental standpoint by the European Union due in part to its endocrine disrupting properties.

In the context of the present description, degradation of ethoxylated nonylphenol to nonylphenol can be mitigated by converting ethoxylated nonylphenol to a derivative form that is either less likely to degrade to nonylphenol or less likely to be released from a coating to the environment in the event that residual amounts of it become incorporated in a coating. In one embodiment, ethoxylated nonylphenol can be converted to a derivative form through reaction with an isocyanate or diisocyanate. In one embodiment, the derivatizing agent is the diisocyanate H12MDI (4,4'-methylenebis(cyclohexyl isocyanate), which has the formula:

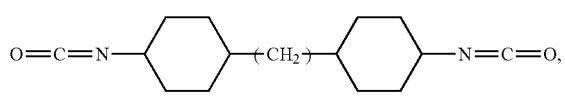

where the reaction produces a derivative compound that includes a urethane linkage and a free isocyanate group:

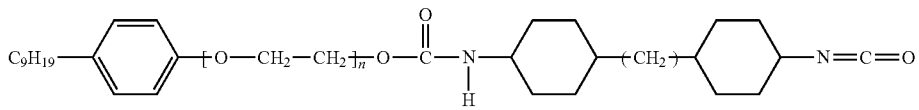

The free isocyanate group may further react with additional equivalents of ethoxylated nonylphenol to form a derivative compound with two urethane linkages:

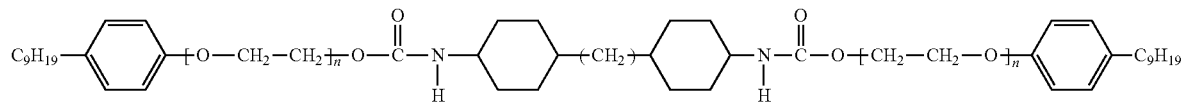

Conversion of polyol (II) to a derivative compound having a urethane linkage is advantageous because the urethane linkage includes a hydrogen donor atom that can participate in hydrogen bonding. When incorporated in a cured coating material, hydrogen bonding can occur between the urethane group and hydrogen acceptor groups in other components of the coating. The hydrogen bonding strengthens the association of the derivative compound with the cured coating and decreases the likelihood that the derivative compound will leach from or otherwise be released from the coating.

Inclusion of a urethane linkage in the derivative compound formed from polyol (II) is also advantageous because it is a stable linkage and is unlikely to react or degrade to produce byproducts that may be environmentally hazardous. Urethane monomers and oligomers are widely used in fiber coatings because of the stability of the urethane linkage. Derivatization of residual polyol (II) with an isocyanate or diisocyanate compound thus produces a derivative compound that is both stable and compatible with other common components present in coating compositions.

In addition to alkoxylated alkyl acrylate monomers, polyol (II) may be present as a residual compound in the oligomer component of the coating composition. As noted above and further described below, oligomer acrylates with urethane linkages are frequently used in coating compositions. The urethane oligomers are most commonly multifunctional acrylates (e.g. urethane diacrylates or urethane triacrylates) that are included as crosslinking agents in the coating composition. Urethane oligomers are commonly prepared from reactions of diols and diisocyanates. Diol reactants include diol variants of polyol (II). A representative oligomer formation reaction is:

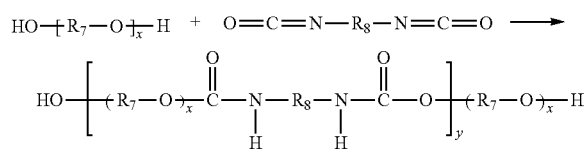

where x and y are integers and $R_7$ and $R_8$ are organic groups. Molecular weights of oligomers are typically in the range from 3000 g/mol to 10,000 g/mol. The oligomers include one or more polyol blocks $((R_7-O)_x)$ and one or more isocyanate blocks $(C(O)NHR_8NHC(O))$. The urethane oligomer product of the reaction can subsequently be acrylated (or diacrylated) by reacting it with methacrylic acid or a substituted methacrylic acid as described hereinabove to form a urethane acrylate oligomer or urethane diacrylate oligomer for use as a component in a fiber coating composition. The urethane diacrylate oligomer has the formula:

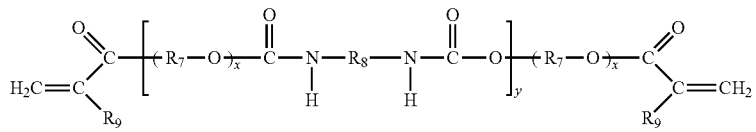

In some embodiments, the oligomer formation reaction may not proceed to completion and the as-prepared oligomer (acrylated or non-acrylated) may contain some unreacted amount of the diol variant of polyol(II). In such embodiment, unreacted diol present in the oligomer component of a coating composition may be treated as described hereinabove to provide a derivative compound that is less susceptible to degradation and/or less susceptible to being released from a coating formed from a composition containing an oligomer derived from the diol.

Treatment of polyol (II) with a derivatizing agent can occur at one or more points of time in the fiber coating process. Fiber coatings are made by curing a coating composition. As described more fully hereinbelow, the coating composition typically includes one or more monomers, one or more oligomers, one or more photoinitiators, and one or more additives. The monomer(s) and oligomer(s) typically include a radiation curable functional group and the coating is formed by applying the composition to a fiber and curing with a UV lamp. The radiation curable functional group may be an acrylate group. The monomer(s) may include alkoxylated alkyl acrylate monomers formed from polyol (II).

Derivatization of unreacted polyol (II) may be accomplished by treating alkoxylated alkyl acrylate monomers with a derivatizing agent. In one embodiment, treatment occurs before combining the alkoxylated alkyl acrylate monomer with other components to form the coating composition. In another embodiment, treatment occurs after combining the alkoxylated alkyl acrylate monomer with other components to form the coating composition and before the coating composition is cured.

Derivatization of unreacted polyol (II) may be accomplished by treating oligomers and coatings that include blocks derived from polyol (II) with a derivatizing agent. In one embodiment, treatment occurs before combining the oligomer with other components to form the coating composition. In another embodiment, treatment occurs after combining the oligomer with other components to form the coating composition and before the coating composition is cured.

In one embodiment, an alkoxylated alkyl acrylate monomer and an oligomer are treated separately with a derivatizing agent and the derivative forms are combined to form a coating composition. In another embodiment, an alkoxylated alkyl acrylate monomer is treated with a derivatizing agent and the oligomer is not treated with a derivatizing agent before combining to form a coating composition. After forming the coating composition and before curing, the coating composition is treated with a derivatizing agent to derivatize the polyol. In still another embodiment, an oligomer treated with a derivatizing agent and an alkoxylated alkyl acrylate monomer is not treated with a derivatizing agent before combining to form a coating composition. After forming the coating composition and before curing, the coating composition is treated with a derivatizing agent to derivatize the alkoxylated alkyl acrylate monomer. In a further embodiment, neither an alkoxylated alkyl acrylate monomer nor an oligomer is treated before combining to form a coating composition and both the alkoxylated alkyl acrylate monomer and oligomer are treated with a derivatizing agent after forming the coating composition and before curing the coating composition.

The amount of derivatizing agent added to an alkoxylated alkyl acrylate monomer or oligomer having a polyol block is preferably enough to minimize the presence of unreacted residual polyol starting material that may be present in an alkoxylated alkyl acrylate monomer, an oligomer with a polyol block, or a coating composition that includes such monomers or oligomers. In one embodiment, an alkoxylated alkyl acrylate monomer is treated before incorporation into a coating composition with an amount of derivatizing agent sufficient to reduce the concentration of residual polyol to less than 1.0 wt %, or less than 0.5 wt %, or less than 0.25 wt %, or less than 0.15 wt %, or less than 0.10 wt %, or less than 0.05 wt %. The derivatizing agent may alternatively be added to the alkoxylated alkyl acrylate monomer in an amount that reacts with substantially all residual polyol. The treated alkoxylated alkyl acrylate monomer may then be combined with other components to form a coating composition.

In another embodiment, an oligomer with a polyol block is treated before incorporation into a coating composition with an amount of derivatizing agent sufficient to reduce the concentration of residual polyol to less than 1.0 wt %, or less than 0.5 wt %, or less than 0.25 wt %, or less than 0.15 wt %, or less than 0.10 wt %, or less than 0.05 wt %. The derivatizing agent may alternatively be added to the oligomer in an amount that reacts with substantially all residual polyol. The treated oligomer may then be combined with other components to form a coating composition.

In still another embodiment, an alkoxylated alkyl acrylate monomer is treated before incorporation into a coating composition with an amount of derivatizing agent sufficient to reduce the concentration of residual polyol to less than 1.0 wt %, or less than 0.5 wt %, or less than 0.25 wt %, or less than 0.15 wt %, or less than 0.10 wt %, or less than 0.05 wt %. The derivatizing agent may alternatively be added to the alkoxylated alkyl acrylate monomer in an amount that reacts with substantially all residual polyol. The treated alkoxylated alkyl acrylate monomer is then combined with an oligomer that has not been treated with a derivatizing agent and with other components to form a coating composition. The resulting coating composition is then treated with an amount of derivatizing agent sufficient to reduce the concentration of residual polyol in the coating composition to less than 1.0 wt %, or less than 0.5 wt %, or less than 0.25 wt %, or less than 0.15 wt %, or less than 0.10 wt %, or less than 0.05 wt %. The derivatizing agent may alternatively be added to the resulting coating composition in an amount that reacts with substantially all residual polyol.

In yet another embodiment, an oligomer with a polyol block is treated before incorporation into a coating composition with an amount of derivatizing agent sufficient to reduce the concentration of residual polyol to less than 1.0 wt %, or less than 0.5 wt %, or less than 0.25 wt %, or less than 0.15 wt %, or less than 0.10 wt %, or less than 0.05 wt %. The derivatizing agent may alternatively be added to the oligomer in an amount that reacts with substantially all residual polyol. The treated oligomer with polyol block is then combined with an alkoxylated alkyl acrylate monomer that has not been treated with a derivatizing agent and with other components to form a coating composition. The resulting coating composition is then treated with an amount of derivatizing agent sufficient to reduce the concentration of residual polyol in the coating composition to less than 1.0 wt %, or less than 0.5 wt %, or less than 0.25 wt %, or less than 0.15 wt %, or less than 0.10 wt %, or less than 0.05 wt %. The derivatizing agent may alternatively be added to the resulting coating composition in an amount that reacts with substantially all residual polyol.

In a further embodiment, an untreated alkoxylated alkyl acrylate monomer and an untreated oligomer with polyol block are combined with other components to form a coating composition and the resulting coating composition is treated before with an amount of derivatizing agent sufficient to reduce the concentration of residual polyol in the coating composition to less than 1.0 wt %, or less than 0.5 wt %, or less than 0.25 wt %, or less than 0.15 wt %, or less than 0.10 wt %, or less than 0.05 wt %. The derivatizing agent may alternatively be added to the resulting coating composition in an amount that reacts with substantially all residual polyol.

The coating composition formed according to any of the foregoing embodiments may be cured to form a coating or other cured product. The resulting coating or cured product may have a concentration of residual polyol less than 1.0 wt %, or less than 0.5 wt %, or less than 0.25 wt %, or less than 0.15 wt %, or less than 0.10 wt %, or less than 0.05 wt %. The resulting coating or cured product may be essentially free of residual polyol.

In the description that follows, various components of coating compositions will be discussed and the amounts of particular components in the coating composition may be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and may be referred to herein as a base composition or base coating composition. Base components include monomer(s), oligomer(s), and curing agent(s). At least one of the monomer(s) or one of the oligomer(s) is curable. The base composition minimally includes a curable component (at least one curable monomer or oligomer) and at least one curing agent. The curing agent is a polymerization initiator that promotes curing of the curable component. The mechanism of curing may be thermal curing or radiation curing. In one embodiment, the curable component includes a radiation-curable group, the mechanism of curing is radiation curing and the curing agent is a photoinitiator. In one embodiment, radiation curing may be accomplished with UV radiation. The base composition may include one or more radiation-curable cross-linker oligomers, one or more radiation-curable diluent monomers, one or more non-radiation-curable monomers or oligomers, and one or more curing agents. The collective amount of base components in a coating composition is regarded herein as equaling 100 weight percent.

Additives are optional and may include one or more of an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive will be expressed herein as 1 pph.

In one embodiment, the coating composition includes a radiation-curable component and a photoinitiator. The radiation-curable component may include one or more radiation-curable compounds. Each radiation-curable compound includes a radiation-curable functional group. The radiation-curable group may be an ethylenically unsaturated group, such as an acrylate or methacrylate group. The radiation-curable compounds may include one or more radiation-curable monomers, one or more radiation-curable oligomers, or a combination of one or more radiation-curable monomers and one or more radiation-curable oligomers. The one or more radiation-curable monomers may include one or more monomers having the structure of polyol (II) as modified by incorporation of a radiation-curable functional group, or one or more monomers derived having the structure of polyol (II) as modified by incorporation of a radiation-curable functional group in combination with one or monomers not having the structure of polyol (II) as modified by incorporation of a radiation-curable functional group. The one or more radiation-curable oligomers may include one or more oligomers with one or more polyol blocks. The one or more radiation-curable oligomers may include one or more oligomers with one or more polyol blocks in combination with one or more oligomers that lack polyol blocks.

The radiation-curable monomer(s) or oligomer(s) may be monofunctional or multifunctional. Multifunctional radiation-curable compounds have two or more radiation-curable functional groups and may function as crosslinking agents. Multifunctional radiation-curable monomer(s) or oligomer(s) may be referred to herein as "crosslinkers". Radiation-curable monomer(s) may function as reactive diluent(s) in the coating composition and may afford control over the viscosity of the coating composition to facilitate processing. In one embodiment, the radiation-curable monomer(s) have a molecular weight in the range from 120-600 g/mol.

The radiation-curable component may include a radiation-curable monofunctional or multifunctional monomer. The monomer may include a monofunctional or multifunctional (meth)acrylate monomer. As used herein, the term "(meth)acrylate" means acrylate or methacrylate. The monomer may include polyether (meth)acrylates, polyester (meth)acrylates, or polyol (meth)acrylates. The multifunctional monomer may be a di(meth)acrylate, tri(meth)acrylate, tetra(meth)acrylate, or higher (meth)acrylate. Monofunctional or multifunctional polyol (meth)acrylates may include monofunctional or multifunctional polyalkoxy (meth)acrylates (e.g. polyethyleneglycol diacrylate, polypropylene glycol diacrylate). The monofunctional or multifunctional monomer may lack urethane groups, urea groups, isocyanate groups, and hydrogen-donor groups. Lack of hydrogen-donor groups precludes the monofunctional or multifunctional monomer from functioning as a hydrogen donor in hydrogen bonding interactions.

Radiation-curable monomers may also include ethylenically-unsaturated compounds, ethoxylated (meth)acrylates, alkoxylated (meth)acrylates, ethoxylated alkylphenol mono (meth)acrylates, propylene oxide (meth)acrylates, n-propylene oxide (meth)acrylates, isopropylene oxide (meth)acrylates, monofunctional (meth)acrylates, monofunctional aliphatic epoxy (meth)acrylates, multifunctional (meth)acrylates, multifunctional aliphatic epoxy (meth)acrylates, and combinations thereof. The radiation-curable monomer may include compounds having the general formula $R''$—$R'$—O—$(CH_2CH(CH_3)$—O$)_n$—COCH=$CH_2$, where $R'$ and $R''$ are aliphatic, aromatic, or a mixture of both, and n is in the range from 1 to 10 (inclusive), or $R'$—O—$(CH_2CH(CH_3)$—O$)_n$—COCH=$CH_2$, where $R'$ is aliphatic or aromatic, and n is in the range from 1 to 10 (inclusive), or formula $R''$—$R'$—O—$(CH_2CH_2$—O$)_n$—COCH=$CH_2$, where $R'$ and $R''$ are aliphatic, aromatic, or a mixture of both, and n is in the range from 1 to 10 (inclusive), or $R'$—O—$(CH_2CH_2$—O$)_n$—COCH=$CH_2$, where $R'$ is aliphatic or aromatic, and n is in the range from 1 to 10 (inclusive).

In certain embodiments, the radiation-curable monomer includes one or more polyols that contain one or more α,β-unsaturated ester, amide, imide, or vinyl ether groups, or combinations thereof. Exemplary classes of polyols include, without limitation, polyol acrylates, polyol methacrylates, polyol maleates, polyol fumarates, polyol acrylamides, polyol maleimides or polyol vinyl ethers comprising one or more acrylate, methacrylate, maleate, fumarate, acrylamide, maleimide or vinyl ether group. The polyol moiety of the radiation-curable monomer can be a polyether polyol, a polyester polyol, a polycarbonate polyol, or a hydrocarbon polyol.

Exemplary monofunctional ethylenically unsaturated radiation-curable monomers include, without limitation, hydroxyalkyl (meth)acrylates such as 2-hydroxyethyl (meth)acrylate, 2-hydroxypropyl (meth)acrylate, 3-hydroxypropyl (meth)acrylate, and 2-hydroxybutyl (meth)acrylate, 3-hydroxybutyl (meth)acrylate, 4-hydroxybutyl (meth)acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from BASF), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, ethyoxylated lauryl acrylate (e.g. CD9075, Sartomer USA (Exton, Pa.), epoxy acrylate (e.g., CN120, Sartomer USA (Exton, Pa.), and EBECRYL 3201 and 3604, Cytec Industries Inc. (Woodland Park, N.J.)), phenoxyethyl acrylate (e.g. SR339 available from Sartomer Company, Inc., Ageflex PEA available from BASF, and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and 2-(2-ethoxyethoxyl)ethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The radiation-curable component of the coating composition may include multifunctional (meth)acrylate monomer(s). Multifunctional (meth)acrylates are (meth)acrylates having two or more curable (meth)acrylate moieties per molecule. The multifunctional (meth)acrylate may have three or more curable (meth)acrylate moieties per molecule. The multifunctional (meth)acrylate may have four or more curable (meth)acrylate moieties per molecule.

Suitable multifunctional ethylenically unsaturated monomers include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR 351 and SR499 available from Sartomer Company, Inc.), methylolpropane polyacrylates with and without alkoxylation such as trimethylolpropane triacrylate (e.g., tripropyleneglycol diacrylate (e.g. SR306, Sartomer USA (Exton, Pa.)); dipropylene glycol diacrylate (e.g. SR508, Sartomer USA (Exton, Pa.)); propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl) isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

The radiation-curable component of the coating composition may include an N-vinyl amide such as an N-vinyl lactam, or N-vinyl pyrrolidinone, or N-vinyl caprolactam.

The radiation-curable component may include a radiation-curable monofunctional or multifunctional oligomer. The oligomer may be a (meth)acrylate-terminated oligomer. The oligomer may include polyether acrylates (e.g., GENOMER 3456, available from Rahn USA (Aurora, Ill.)), polyester acrylates (e.g., EBECRYL 80, 584 and 657, available from Cytec Industries Inc. (Woodland Park, N.J.)), or polyol acrylates. The oligomer may be a di(meth)acrylate, tri(meth)acrylate, tetra(meth)acrylate, or higher (meth)acrylate. Polyol (meth)acrylates may include polyalkoxy(meth)acrylates or polyol(meth)acrylates. Examples include polyethylene glycol diacrylate and polypropylene glycol diacrylate. The monofunctional or multifunctional oligomer may lack urethane groups, urea groups, isocyanate groups, and/or hydrogen-donor groups.

In certain embodiments, the radiation-curable oligomer may include one or more polyols that contain two or more $\alpha,\beta$-unsaturated ester, amide, imide, or vinyl ether groups, or combinations thereof. Exemplary classes of these polyol-containing oligomers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety can be a polyether polyol, a polyester polyol, a polycarbonate polyol, or a hydrocarbon polyol.

A monofunctional radiation-curable monomer may be present in the radiation-curable coating composition at a concentration from 10-60 wt %, or from 10-30 wt %, or from 30-60 wt %, or from 40-80 wt %, or from 60-80 wt %. The radiation-curable coating composition may include one or more monofunctional (meth)acrylate monomers in an amount from 5-95 wt %, or from 0-75 wt %, or from 40-65 wt %. The radiation-curable coating composition may include one or more monofunctional aliphatic epoxy (meth) acrylate monomers in an amount from 5-40 wt %, or from 10-30 wt %.

A multifunctional radiation-curable monomer may be present in the radiation-curable coating composition at a concentration from 0.05-15 wt %, or from 0.1-10 wt %, or from 0.5-10 wt %, or from 1-5 wt %, or from 1-10 wt %, or from 1-20 wt %, or from 1-50 wt %, or from 2-8 wt %, or from 5-40 wt %, or from 10-30 wt %, or from 20-30 wt %.

The total monomer content of the radiation-curable coating composition may be between about 5 wt % and about 95 wt %, or between about 30 wt % and about 75 wt %, or between about 40 wt % and about 65 wt %.

The total oligomer content of the radiation-curable coating composition may be less than 5 wt %, or between about 5 wt % and about 95 wt %, or between about 25 wt % and about 65 wt %, or between about 35 wt % and about 55 wt %. The oligomer content of secondary coatings is generally higher than the oligomer content of primary coatings.

The base coating composition further includes one or more curing agents. A curing agent is a polymerization initiator that initiates a curing reaction of curable components in the coating composition. The polymerization initiator is a reagent that is suitable to cause polymerization (i.e., curing) of the composition after its application to a glass fiber or other receiving surface. Polymerization initiators suitable for use in coating compositions include thermal initiators, chemical initiators, electron beam initiators, and photoinitiators. Photoinitiators are the preferred polymerization initiators. For most acrylate-based coating formulations, conventional photoinitiators, such as the known ketonic photoinitiators and/or phosphine oxide photoinitiators, are preferred. When used in the coating compositions, the photoinitiator is present in an amount sufficient to provide rapid curing upon exposure of the coating composition to curing radiation. The curing radiation may be UV radiation. Generally, amount of the one or more photoinitiators in the coating composition is between about 0.5 to about 10.0 percent by weight, more preferably between about 1.5 to about 7.5 percent by weight.

The photoinitiator, when used in a small but effective amount to promote radiation cure, should provide reasonable cure speed without causing premature gelation of the coating composition. A desirable cure speed is any speed sufficient to cause substantial curing of the coating materials. As measured in a dose versus modulus curve, a cure speed for coating thicknesses of about 25-35 µm is, e.g., less than 1.0 J/cm$^2$, preferably less than 0.5 J/cm$^2$.

Suitable photoinitiators include, without limitation, 1-hydroxycyclohexylphenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucerin TPO available from BASF, Munich, Germany), ethoxy(2,4,6-trimethylbenzoyl)phenyl phosphine oxide (e.g. Lucerin TPO-L from BASF), and combinations thereof.

In addition to base components such as monomer(s), oligomer(s), and curing agent(s), the coating compositions may also include one or more additives. Representative additives include an adhesion promoter, an antioxidant, a catalyst, a carrier or surfactant, a tackifier, a stabilizer, and an optical brightener. Some additives (e.g., catalysts, reactive surfactants, and optical brighteners) may operate to control the polymerization process and may thereby affect the physical properties (e.g., modulus, glass transition temperature) of the cured product formed from the coating composition. Other additives may influence the integrity of the cured product of the coating composition (e.g., protect against de-polymerization or oxidative degradation).

As is well known in the art, an adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (e.g. Irganox 1035, available from BASF). The antioxidant, if present, is used in an amount between about 0.1 to about 3 pph, more preferably about 0.25 to about 2 pph.

An exemplary catalyst is a tin-catalyst, which is used to catalyze the formation of urethane bonds in some non-radiation curable components. Whether the catalyst remains as an additive of the non-radiation curable component or additional quantities of the catalyst are introduced into the composition, the presence of the catalyst can act to stabilize the non-radiation curable component(s) in the composition.

Suitable carriers, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 to about 5 pph, more preferably about 0.25 to about 3 pph. Other classes of suitable carriers include non-reactive surfactants. Examples of suitable non-reactive surfactants include, without limitation, Tegoglide 435 (polyalkoxy-polysiloxane) available from Goldschmidt Chemical Co. The non-reactive surfactants may be present in a preferred amount between about 0.01 pph to about 10 pph, more preferably about 0.05 pph to about 5 pph, most preferably about 0.1 pph to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-Tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez® series of hydrocarbon tackifiers available from Exxon. For additional information regarding tackifiers, see U.S. Pat. No. 5,242,963. The aforementioned carriers may also be used in combination. Preferably, the tackifier is present in the composition in an amount between about 0.01 to about 10 pph, more preferably in the amount between about 0.05 to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 to about 1 pph, more preferably about 0.01 to about 0.2 pph.

Any suitable optical brightener can be employed. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis (styryl)biphenyl compounds. The optical brightener is desirably present in the composition at a concentration of about 0.003 to about 0.5 pph, more preferably about 0.005 to about 0.3 pph.

Another aspect of the exemplary embodiments relates to a method of making a coated optical fiber having one or more coatings formed from one or more coating compositions that include one or more treated components as described herein. This method can generally be performed by standard methods with the use of treated coating composition(s) or coating compositions including one or more treated monomer(s) and/or oligomer(s) in accordance with the present description. In one embodiment, the fiber includes a primary coating and a secondary coating, where the primary coating surrounds the glass region (core+cladding) and the secondary coating surrounds the primary coating. In one embodiment, the primary coating is a treated coating composition or a coating composition with one or more treated monomer(s) and/or oligomer(s). In another embodiment, the secondary coating is a treated coating composition or a coating composition with one or more treated monomer(s) and/or oligomer(s). In still another embodiment, the primary coating is a treated coating composition or a coating composition with one or more treated monomer(s) and/or oligomer(s) and the secondary coating is a treated coating composition or a coating composition with one or more treated monomer(s) and/or oligomer(s).

The fiber coating process involves fabricating the glass fiber (using methods familiar to the skilled artisan), applying a curable primary coating composition to the glass fiber, polymerizing the curable primary coating composition to form the primary coating material, applying a curable secondary coating composition to the cured primary coating, and polymerizing the curable secondary composition to form the secondary coating material. This is known as a "wet-on-dry" process. Optionally, the curable secondary coating composition can be applied to the coated fiber before polymerizing the curable primary coating composition, in which case both coating compositions may be cured simultaneously. This is known as a "wet-on-wet" process.

The primary and secondary coating compositions are coated on a glass fiber using conventional processes, for example, on a draw tower. It is well known that glass fibers can be drawn from a specially prepared, cylindrical silica-based preform that has been locally and symmetrically heated to a temperature, e.g., of about 2000° C. As the preform is heated, such as by feeding the preform into and through a furnace, a glass fiber is drawn from the molten material and cooled. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and un-cured) coating composition on the glass fiber to ultraviolet light, actinic radiation, microwave radiation, or electron beam, depending upon the nature of the coating composition(s) and curing agent being employed. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety.

The present coating compositions may also be cured to form coatings for an optical fiber ribbon. An optical fiber ribbon includes a plurality of optical fibers embedded in an encapsulating matrix, where the encapsulating matrix may be a cured coating composition. The optical fibers are substantially aligned relative to one another in a substantially planar relationship in forming the ribbon. It is preferable that the optical fibers are not displaced from a common plane by a distance of more than about one-half the diameter of the individual fibers. By "substantially aligned", it is intended that the optical fibers are generally parallel with other optical fibers along the length of the fiber optic ribbon. The optical fibers in fiber optic ribbons may be encapsulated by the matrix in any known configuration (e.g., edge-bonded ribbon, thin-encapsulated ribbon, thick-encapsulated ribbon, or multi-layer ribbon) by conventional methods of making fiber optic ribbons.

The encapsulating matrix can be the cured product of a coating composition in accordance with the present description. Preferably, the encapsulating matrix has characteristics consistent with a secondary composition to ensure adequate durability and strength. The skilled artisan will appreciate that the optical fibers in a fiber ribbon may include a dual-layer coating system (for example, the primary and secondary coatings described hereinabove), and may be colored with a marking ink. The encapsulating matrix of the fiber ribbon may simultaneously serve as the secondary coating of the fibers. In this embodiment, a plurality of optical fibers having a primary coating is aligned and the matrix composition is applied and cured.

EXAMPLES

The following examples consider fiber coatings formed by curing coating compositions that include ethoxylated nonylphenol acrylate as a component. The ethoxylated nonylphenol acrylate is included as a reactive diluent monomer in the coating compositions. As indicated hereinabove, residual amounts of ethoxylated nonylphenol may be present in the source of ethoxylated nonylphenol acrylate and may become incorporated in coatings formed by curing coating compositions that include ethoxylated nonylphenol acrylate. By way of example, the level of ethoxylated nonylphenol in the coatings of several commercial optical fibers is listed in Table 1. The coatings are proprietary to the manufacturer and are listed without reference to the manufacturer or supplier.

TABLE 1

Concentration of Ethoxylated Nonylphenol in Representative Commercial Coatings

| Coating | Ethoxylated Nonyphenol (wt %) |
|---|---|
| A | 0.384 |
| B | 0.416 |
| C | 0.287 |
| D | 0.273 |
| E | 0.439 |
| F | 0.408 |
| G | 0.520 |
| H | 0.426 |
| I | 0.530 |
| J | 0.255 |
| K | 0.183 |

The data in the table indicate that ethoxylated nonylphenol is present at residual levels in several widely used fiber coatings. In each of the coatings listed, the concentration of ethoxylated nonylphenol exceeds the 0.1 wt % limit specified by the European Union in its REACh report identifying ethoxylated nonylphenol as a substance of very high concern (SVHC).

A sample of a representative commercially available ethoxylated nonylphenol acrylate was obtained and analyzed by HPLC to determine the level of residual ethoxylated nonylphenol. The sample was ethoxylated(4)nonylphenol acrylate (SR504, Sartomer, Inc.) and had the formula:

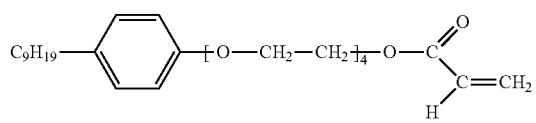

where the corresponding polyol (ethoxylated(4)nonylphenol) has the formula:

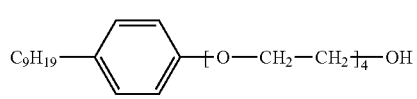

The HPLC measurements revealed peaks corresponding to three components: ethoxylated(4)nonylphenol acrylate, ethoxylated(4)nonylphenol, and the Michael addition product of ethoxylated(4)nonylphenol acrylate and ethoxylated (4)nonylphenol. The peaks were quantified and the relative weight percent of each of the three components was determined. The results of the HPLC analysis of the sample are shown in Table 2, where the numbers in the table correspond to the amount of each component in the sample in units of wt % (weight percent):

TABLE 2

HPLC Analysis of Untreated Ethoxylated(4) Nonylphenol Acrylate

| Ethoxylated(4) Nonylphenol Acrylate | Ethoxylated(4) Nonylphenol | Michael Addition Product |
|---|---|---|
| 94.0 | 3.3 | 2.6 |

The HPLC results confirm the presence of residual amounts of ethoxylated(4)nonylphenol in commercial ethoxylated(4) nonylphenol acrylate.

In the next experiments, tensile properties of films formed from a Control coating composition and a Test coating composition were measured. The components and amounts used to prepare the two coating compositions are listed in Table 3. The Test composition also included 75 g of the derivatizing agent H12MDI (4,4'-methylenebis(cyclohexyl isocyanate). No derivatizing agent was added to the Control composition.

TABLE 3

Formulations of Coating Compositions

| | Control Composition | | Test Composition | |
|---|---|---|---|---|
| Component | Amount | Concentration | Amount | Concentration |
| BR3741 | 5205 g | 52.0 wt % | 4160 g | 52.0 wt % |
| SR504 | 4165 g | 41.5 wt % | 3315 g | 41.4 wt % |
| Caprolactone Acrylate | 510 g | 5.1 wt % | 405 g | 5.1 wt % |
| Irgacure 819 | 150.5 g | 1.5 wt % | 121 g | 1.5 wt % |
| Pentaerythritol Mercaptopropionate | 3.2 g | 0.032 pph | 2.6 g | 0.032 pph |
| Irganox 1035 | 100.8 g | 1.0 pph | 81.6 g | 1.0 pph |
| (3-Acryloxypropyl) trimethoxysilane | 100.3 g | 1.0 pph | 81 g | 1.0 pph |

In the compositions, BR3741 is an oligomer having the formula:

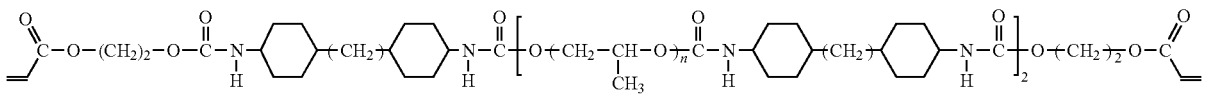

where n~70. SR 504 is a monomer having the formula

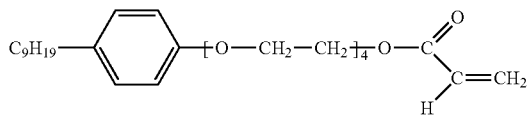

Caprolactone acrylate is a monomer having the formula

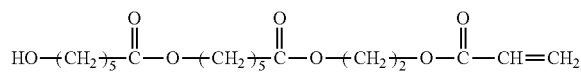

Irgacure 819 is bis(2,4,6-trimethyl benzoyl)phenyl-phosphine oxide) and is a photoinitiator. Pentaerythritol tetrakis (3-mercaptopropionate) is a stabilizer and has the formula:

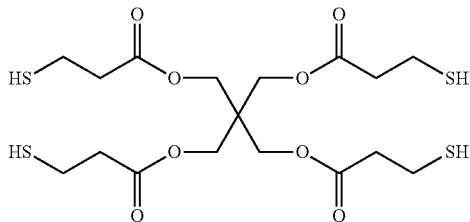 [SMILES: O=C(CCS)OCC(COC(=O)CCS)(COC(=O)CCS)COC(=O)CCS]

Irganox 1035 is thiodiethylene bis(3,5-di-tert-butyl)-4-hydroxyhydrocinnamate and is an antioxidant. 3-acryloxypropyltrimethoxysilane is an adhesion promoter.

Figure 2:
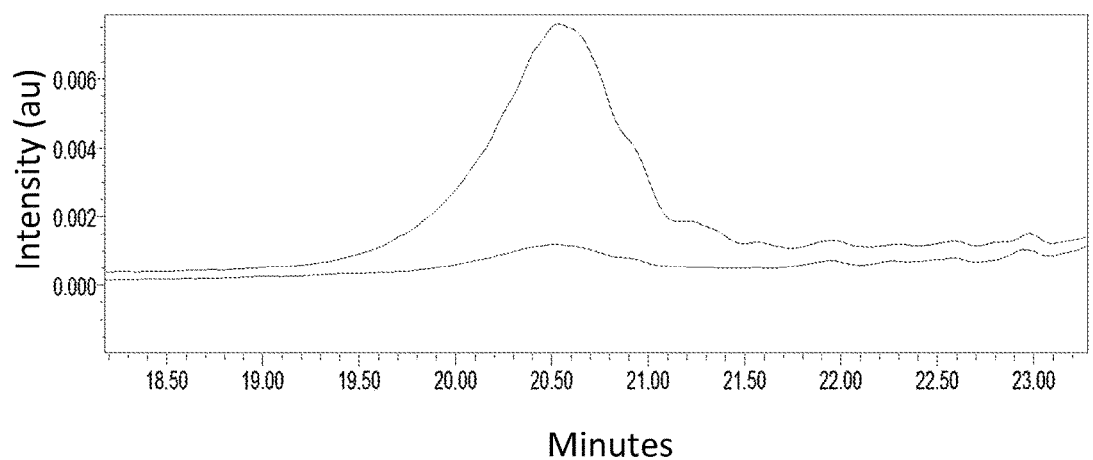
FIG. 2 illustrates the HPLC elution peak of ethoxylated (4)nonylphenol before and after treatment with a diisocyanate derivatizing agent.

To prepare the Control composition, the components of the formulation listed in Table 3 were combined and mixed to form a uniform composition. The Test composition included the derivatizing agent H12MDI and was prepared by first combining the BR3741 oligomer and the SR504 monomer. 75 g of H12MDI was then added and the mixture was stirred at 70° C. for several hours to insure that the derivatization reaction was complete. Derivatization was intended to derivatize residual ethoxylated(4)nonylphenol present in the SR504 monomer. Derivatization proceeded according to the reaction:

As the derivatization reaction proceeded, the concentration of H12MDI and ethoxylated(4)nonylphenol decreased. The relative amount of H12MDI during the course of the reaction was monitored by measuring the intensity of a characteristic infrared absorption band of the isocyanate group. The characteristic isocyanate absorption band occurs between 2270-2240 cm$^{-1}$ and is shown at different times during the reaction in FIG. 1. The absorption band had highest intensity at initial reaction times and progressively decreased as the reaction proceeded. FIG. 2 shows an HPLC measurement of the peak associated with ethoxylated(4)nonylphenol before introduction of the derivatizing agent and after completion of the derivatization reaction. The HPLC peak exhibited high intensity before the derivatization reaction and was essentially eliminated at the conclusion of the derivatization reaction. The data in FIGS. 1 and 2 show simultaneous depletion of H12MDI and ethoxylated (4) nonylphenol as expected from the derivatization reaction.

The relative concentrations (in wt %) of ethoxylated(4) nonylphenol acrylate, ethoxylated(4)nonylphenol, and the Michael addition product of ethoxylated(4)nonylphenol acrylate and ethoxylated(4)nonylphenol of the derivatized mixture of BR3741 oligomer and SR504 monomer were determined from HPLC data and are reported in Table 4. Data for the untreated (non-derivatized) SR504 monomer reported above in Table 2 are repeated for comparison purposes. The data indicate that derivatization of ethoxylated(4)nonylphenol acrylate with H12MDI eliminated

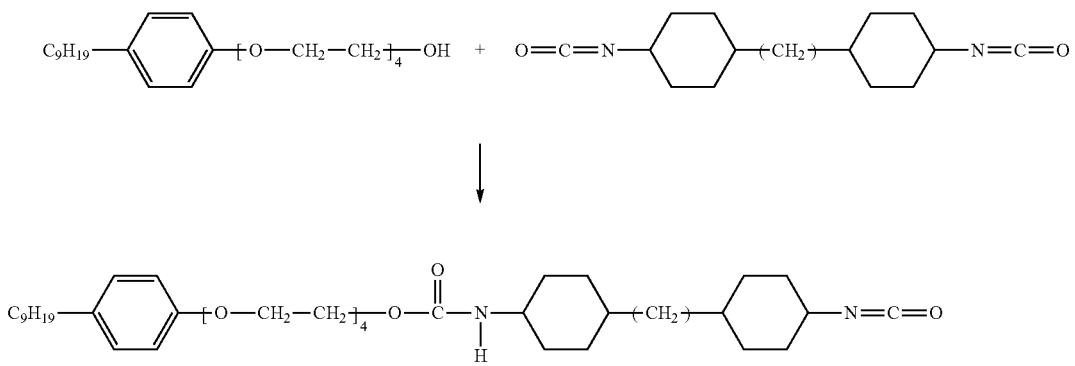

where the free isocyanate group on the product can further react with ethoxylated(4)nonylphenol to form:

residual ethoxylated(4)nonylphenol to a level below the detection limit of the HPLC measurement.

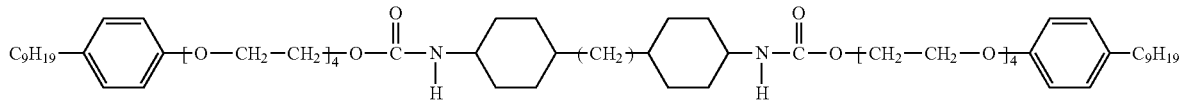

TABLE 4

| | HPLC Analysis of Ethoxylated(4) Nonylphenol Acrylate Monomer | | |
|---|---|---|---|
| State of Monomer | Ethoxylated(4) Nonylphenol Acrylate | Ethoxylated(4) Nonylphenol | Michael Addition Product |
| Untreated | 94.0 | 3.3 | 2.6 |
| Treated | 95.9 | less than 0.4 | 3.71 |

The remaining components (caprolactone acrylate, Irgacure 819, pentaerythritol tetrakis(3-mercaptopropionate), Irganox 1035, 3-acryloxypropyltrimethoxysilane) of the formulation were added to the derivatized mixture of BR3741 oligomer and SR504 monomer to form the Test coating composition.

Small portions of the Test coating composition and Control coating composition were cured to form films for measurements of tensile properties and $T_g$. The films were prepared by drawing down portions of the formulations on release paper using a 5 mil (~125 μm) draw down bar. Films were cured using a Fusion D lamp with a nitrogen purge. The films received a dose of approximately 1200 mJ/cm². All film samples were allowed to condition overnight in a controlled environment at 23° C. and 50% relative humidity. The thickness of the cured films was ~80 μm.

Tensile properties of the cured films were measured using a Sintech MTS tensile test instrument according to procedures set forth in ASTM Standard D882-97. Films were cut to a specified length and width (15 cm×1.3 cm) and mounted in the test instrument. The gauge length used for testing was 5.1 cm and the test speed was 2.5 cm/minute. Young's modulus, tensile strength, and % elongation values were recorded.

The results of the tensile testing measurements on cured film samples of the test and control coating compositions are presented in Table 5:

TABLE 5

| | Tensile Properties of Cured Films | | |
|---|---|---|---|
| Coating Composition | Tensile Strength (MPa) | % Elongation | Young's Modulus (MPa) |
| Test | 1.28 (±0.72) | 126.89 (±18.98) | 0.88 (±0.04) |
| Control | 0.92 (±0.24) | 117.17 (±11.8) | 0.84 (±0.03) |

The tensile property results indicate that the properties of cured films formed with the Test composition (which included a derivatizing agent that acted to derivatize ethoxylated(4)nonylphenol acrylate monomer) were comparable to the properties of cured films formed from the Control composition (which included non-derivatized ethoxylated (4)nonylphenol acrylate monomer). The presence of derivatized ethoxylated(4)nonylphenol was not observed to negatively impact the properties of the cured films. The results further indicated that the presence of residual ethoxylated (4)nonylphenol in the untreated ethoxylated(4)nonylphenol acrylate monomer used in the Control coating composition was not a controlling factor in determining the properties of cured films formed from the Control composition. From an environmental standpoint, the results indicate that treatment of ethoxylated(4)nonylphenol acrylate monomer with a derivatizing agent reduces the presence of ethoxylated(4) nonylphenol in the coating composition without detracting from the performance of cured products formed from the coating composition.

Unless otherwise expressly stated, ranges disclosed herein are inclusive of end points. By way of example, a statement that "n is in the range from 1 to 10", "n is in the range from 1-10", or like statement shall be construed to mean that n may be 1, 10, or any integer greater than 1 and less than 10. Similarly, a statement that a particular component is present in a coating composition "in an amount from 20-30 wt %", or "in an amount between 20-30 wt %", or "in an amount between 20 and 30 wt %", or like statement shall be constructed to mean that the wt % of the component may be 20 wt %, 30 wt %, or any wt % between 20 wt % and 30 wt %.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equival

What is claimed is:

1. A coating composition comprising:
an acrylate monomer having the formula

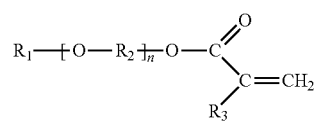

and a derivative compound having the formula

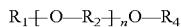

wherein n is an integer, $R_1$ is H, an alkyl group, an aromatic group, or an alkyl-substituted aromatic group, $R_2$ is an alkylene group, $R_3$ is H or an alkyl group, and $R_4$ is not H; and wherein $R_1$ of said acrylate monomer is the same as $R_1$ of said derivative compound, $R_2$ of said acrylate monomer is the same as $R_2$ of said derivative compound, n of said acrylate monomer is the same as n of said derivative compound, and said acrylate monomer differs from said derivative compound.

2. The coating composition of claim 1, wherein $R_1$ is an alkyl group and $R_2$ is a linear alkylene group.

3. The coating composition of claim 2, wherein $R_3$ is H or a methyl group.

4. The coating composition of claim 2, wherein $R_2$ is methylene, ethylene, or propylene and $R_3$ is H.

5. The coating composition of claim 1, wherein $R_1$ is a nonyl-substituted phenyl group, $R_2$ is ethylene, and $R_3$ is H.

6. The coating composition of claim 1, wherein n is in the range from 3 to 8.

7. The coating composition of claim 1, wherein said derivative compound is

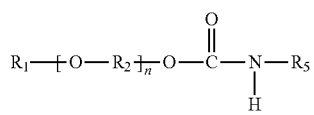

and $R_5$ is an organic group.

8. The coating composition of claim 7, wherein said derivative compound is

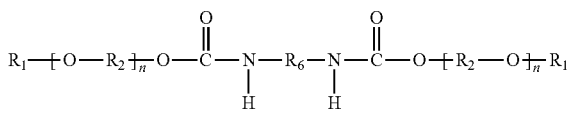

and $R_6$ is an organic group.

9. The coating composition of claim 8, wherein $R_6$ is

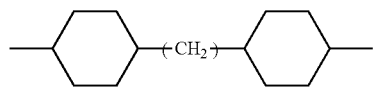

10. The coating composition of claim 1, further comprising a photoinitiator.

11. The coating composition of claim 1, further comprising an oligomer, said oligomer comprising two or more acrylate groups.

12. The coating composition of claim 11, wherein said oligomer has the formula:

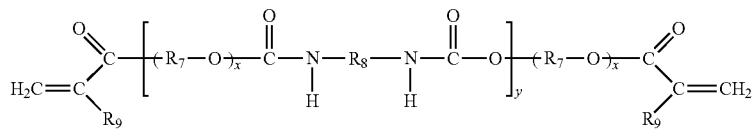

and $R_7$ is an organic group, $R_8$ is an organic group, and $R_9$ is hydrogen or an alkyl group.

13. The coating composition of claim 12, further comprising a second derivative compound having the formula:

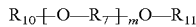

wherein $R_{10}$ is H, an alkyl group, an aromatic group, or an alkyl-substituted aromatic group, $R_7$ is an alkylene group, $R_{11}$ is not H, and at least one of $R_{10}$, $R_7$, and $R_{11}$ differs respectively from $R_1$, $R_2$, and $R_4$.

14. The coating composition of claim 13, wherein $R_{11}$ is the group:

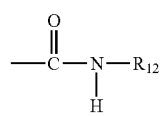

and $R_{12}$ is an organic group.

15. The coating composition of claim 1, further comprising a polyol having the formula:

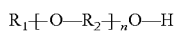

wherein $R_1$ of said polyol is the same as $R_1$ of said derivative compound, $R_2$ of said polyol is the same as $R_2$ of said derivative compound, and n of said polyol is the same as n of said derivative compound.

16. The cured product of a coating composition, said coating composition comprising:
an acrylate monomer having the formula

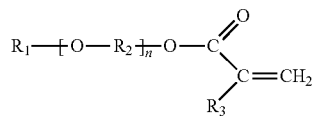

and a derivative compound having the formula

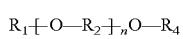

wherein n is an integer, $R_1$ is H, an alkyl group, an aromatic group, or an alkyl-substituted aromatic group, $R_2$ is an alkylene group, $R_3$ is H or an alkyl group, and $R_4$ is not H; and
wherein $R_1$ of said acrylate monomer is the same as $R_1$ of said derivative compound, $R_2$ of said acrylate monomer is the same as $R_2$ of said derivative compound, n of said acrylate monomer is the same as n of said derivative compound, and said acrylate monomer differs from said derivative compound.

17. The cured product of claim 16, wherein said cured product further comprises a polyol compound having the formula

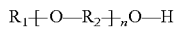

18. The cured product of claim 17, wherein the concentration of said polyol compound in said cured product is less than 0.15 wt %.

19. The cured product of claim 17, wherein $R_1$ is a nonyl-substituted phenyl group, $R_2$ is ethylene, and $R_3$ is H.

20. The cured product of claim 19, wherein said derivative compound includes a urethane linkage.

21. A method of forming a coating comprising treating a monomer composition with a derivatizing agent to form a coating composition, said monomer composition comprising:

an acrylate monomer having the formula:

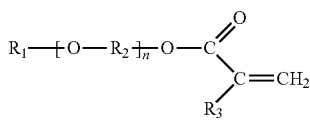

and a polyol having the formula:

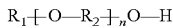

said derivatizing agent converting said polyol to a derivative compound having the formula:

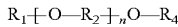

wherein n is an integer, $R_1$ is H, an alkyl group, an aromatic group, or an alkyl-substituted aromatic group, $R_2$ is an alkylene group, $R_3$ is H or an alkyl group, and $R_4$ is not H; and wherein $R_1$ of said acrylate monomer is the same as $R_1$ of said derivative compound, $R_2$ of said acrylate monomer is the same as $R_2$ of said derivative compound, n of said acrylate monomer is the same as n of said derivative compound, and said acrylate monomer differs from said derivative compound.

22. The method of claim 21, wherein $R_1$ is an alkyl group and $R_2$ is a linear alkylene group.

23. The coating composition of claim 22, wherein $R_3$ is H or a methyl group.

24. The method of claim 22, wherein $R_1$ is a $C_4$ or higher alkyl group; $R_2$ is methylene, ethylene, or propylene; and $R_3$ is H.

25. The method of claim 21, wherein $R_1$ includes an aromatic group; $R_2$ is methylene, ethylene, or propylene; and $R_3$ is H.

26. The method of claim 21, wherein $R_1$ is a nonylphenyl group, $R_2$ is ethylene, and $R_3$ is H.

27. The method of claim 21, wherein n is in the range from 3 to 8.

28. The method of claim 21, wherein said derivatizing agent has the formula:

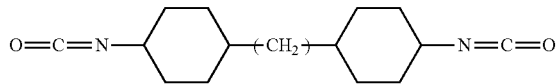

29. The method of claim 21, wherein said treating reduces the concentration of said polyol in said coating composition to less than 0.10 wt %.

30. The method of claim 21, further comprising:
adding a photoinitiator to said coating composition; and
curing said coating composition.

31. The method of claim 30, further comprising adding an oligomer to said coating composition, said oligomer comprises a compound having the formula

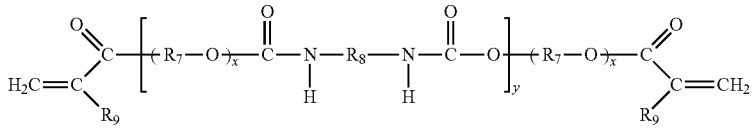

and $R_7$ is an organic group, $R_8$ is an organic group, and $R_9$ is hydrogen or an alkyl group.

32. The method of claim 31, wherein said oligomer further comprises a diol compound having the formula

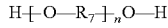

33. The method of claim 32, further comprising treating said oligomer with a derivatizing agent, said derivatizing agent converting said diol to a derivative compound, said diol derivative compound comprising a compound having the formula

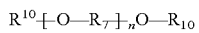

and $R_{10}$ is an organic group.

34. The method of claim 33, wherein said derivatizing agent comprises an isocyanate or diisocyanate compound.

35. A method of forming a coating comprising:
combining a monomer composition with an oligomer to form a coating composition, said monomer composition comprising:
an acrylate monomer having the formula:

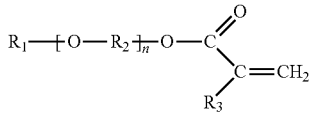

and a polyol having the formula:

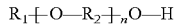

treating said coating composition with a derivatizing agent, said derivatizing agent converting said polyol to a derivative compound having the formula:

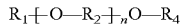

wherein n is an integer, $R_1$ is H, an alkyl group, an aromatic group, or an alkyl-substituted aromatic group, $R_2$ is an alkylene group, $R_3$ is H or an alkyl group, and $R_4$ is not H; and wherein $R_1$ of said acrylate monomer is the same as $R_1$ of said derivative compound, $R_2$ of said acrylate monomer is the same as $R_2$ of said derivative compound, n of said acrylate monomer is the same as n of said derivative compound, and said acrylate monomer differs from said derivative compound.

36. The coating composition of claim 15, wherein said polyol is present in said coating composition in an amount less than 0.25 wt %.

37. The coating composition of claim 15, wherein said polyol is present in said coating composition in an amount less than 0.10 wt %.

\* \* \* \* \*

UNITED STATES PATENT AND TRADEMARK OFFICE
CERTIFICATE OF CORRECTION

PATENT NO. : 9,708,491 B2
APPLICATION NO. : 14/711909
DATED : July 18, 2017
INVENTOR(S) : John William Botelho et al.

It is certified that error appears in the above-identified patent and that said Letters Patent is hereby corrected as shown below:

In the Claims

In Column 32, Line 37 (approx.), Claim 33, delete "$R^{10}$" and insert -- $R_{10}$ --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*